(12) United States Patent
Xiong et al.

(10) Patent No.: US 11,023,761 B2
(45) Date of Patent: Jun. 1, 2021

(54) ACCURATE ROI EXTRACTION AIDED BY OBJECT TRACKING

(71) Applicant: EagleSens Systems Corporation, Grand Cayman (KY)

(72) Inventors: Weihua Xiong, Cupertino, CA (US); Guangbin Zhang, Cupertino, CA (US)

(73) Assignee: EAGLESENS SYSTEMS CORPORATION, George Town (KY)

( * ) Notice: Subject to any disclaimer, the term of this patent is extended or adjusted under 35 U.S.C. 154(b) by 0 days.

(21) Appl. No.: 16/161,412

(22) Filed: Oct. 16, 2018

(65) Prior Publication Data

US 2019/0138833 A1 May 9, 2019

Related U.S. Application Data

(60) Provisional application No. 62/582,306, filed on Nov. 6, 2017.

(51) Int. Cl.
| | |
|---|---|
| *G06T 1/00* | (2006.01) |
| *G06K 9/32* | (2006.01) |
| *G06K 9/34* | (2006.01) |
| *G06K 9/62* | (2006.01) |
| *G06T 7/187* | (2017.01) |
| *G06K 9/00* | (2006.01) |

(52) U.S. Cl.
CPC ....... *G06K 9/3233* (2013.01); *G06K 9/00771* (2013.01); *G06K 9/342* (2013.01); *G06K 9/6298* (2013.01); *G06T 7/187* (2017.01); *G06K 2009/3291* (2013.01); *G06T 2207/20081* (2013.01)

(58) Field of Classification Search
CPC ............... G06T 3/0056; G06T 1/20; G06T 2207/20081; G06T 19/003; G06T 7/0012; G06T 2207/30068; G06K 9/6298; G06K 77/187; G06K 9/3233; G06K 9/342; G06F 3/04842; G06F 3/04815
USPC ........... 382/103; 348/222.1; 715/771
See application file for complete search history.

(56) References Cited

U.S. PATENT DOCUMENTS

2015/0310370 A1* 10/2015 Burry .................. G06T 7/20
705/7.26

* cited by examiner

*Primary Examiner* — Phuoc H Doan

(57) ABSTRACT

An image data processing method includes receiving frame image data of N frames, where N>1, detecting a region of interest in one of the N frames, tracking locations of the region of interest in at least one of the N frames, and providing a merged location of the region of interest based on the locations of the region of interest in the N frames. Some embodiments include providing T of the merged locations of the region of interest for T respective groups of N frames, where T>1, providing respective statistical data for each of the T merged locations, and providing a final location of the region of interest based on the T merged locations and the statistical data for the T merged locations.

12 Claims, 9 Drawing Sheets

ACCURATE ROI EXTRACTION AIDED BY OBJECT TRACKING

CROSS REFERENCE TO RELATED APPLICATION

The present application claims priority to U.S. Provisional Patent Application No. 62/582,306, filed Nov. 6, 2017, entitled "Accurate ROI Extraction Aided by Object Tracking," the entire content of which is incorporated by reference herein.

FIELD OF THE INVENTION

This disclosure generally relates to image data processing methods based on artificial intelligence and image sensors configured to perform the same.

BACKGROUND

A region of interest (ROI) is subset of image pixels that are identified for a particular purpose. This concept is commonly used in image and vision related applications. Normally, several objects, and their locations in the image, are needed from a single scene. For example, in surveillance systems, the system typically concentrates on several specific subjects, such as vehicle license plates, faces, etc., at the same time.

Many ROI extraction methods have been proposed. Recently, many machine learning approaches have been proposed, including Support Vector Machine (SVM), Adaboost, and Convolutional Neural Network (CNN). However, all of these methods extract ROIs from a single frame (image) and therefore inevitably produce false detections.

SUMMARY

In general, one aspect disclosed features an image data processing method comprising: receiving frame image data of N frames, where N>1; detecting a region of interest in one of the N frames; tracking locations of the region of interest in at least one of the N frames; and providing a merged location of the region of interest based on the locations of the region of interest in the N frames.

Embodiments of the method may include one or more of the following features. Some embodiments comprise providing T of the merged locations of the region of interest for T respective groups of N frames, where T>1; providing respective statistical data for each of the T merged locations; and providing a final location of the region of interest based on the T merged locations and the statistical data for the T merged locations. In some embodiments, the statistical data for each of the T merged locations comprises at least one of: a number of the frames in which the region of interest appeared; and a percentage of the frames in which the region of interest appeared. Some embodiments comprise receiving a previously-detected location for the region of interest; and providing the final location of the region of interest based on the previously-detected location, the T merged locations, and the statistical data for the T merged locations. Some embodiments comprise receiving trained parameters of feature descriptions; detecting at least one potential ROI in a first frame in the sequence; and detecting the region of interest based on the at least one detected potential ROI. Some embodiments comprise tracking the locations of the region of interest based on the at least one detected potential ROI.

In general, one aspect disclosed features an image sensor comprising: an image input unit configured to receive, from the image sensor, receiving frame image data of N frames, wherein N>1; a detect unit configured to detect a region of interest in one of the N frames; a track unit configured to track locations of the region of interest in at least one of the N frames; and an analysis unit configured to provide a merged location of the region of interest based on the locations of the region of interest in the N frames.

Embodiments of the image sensor may include one or more of the following features. In some embodiments, the analysis unit is further configured to: provide T of the merged locations of the region of interest for T respective groups of N frames, wherein T>1; provide respective statistical data for each of the T merged locations; and provide a final location of the region of interest based on the T merged locations and the statistical data for the T merged locations. In some embodiments, the statistical data for each of the T merged locations comprises at least one of: a number of the frames in which the region of interest appeared; and a percentage of the frames in which the region of interest appeared. Some embodiments comprise an ROI input unit configured to receive a previously-detected location for the region of interest; wherein the analysis unit is further configured to provide the final location of the region of interest based on the previously-detected location, the T merged locations, and the statistical data for the T merged locations. Some embodiments comprise receiving trained parameters of feature descriptions; wherein the detect unit is further configured to detect at least one potential ROI in a first frame in the sequence based on the trained parameters of feature descriptions; and wherein the detect unit is further configured to detect the region of interest based on the at least one detected potential ROI. In some embodiments, the track unit is further configured to: track the locations of the region of interest based on the at least one detected potential ROI.

In general, one aspect disclosed features a non-transitory machine-readable storage medium encoded with instructions executable by a hardware processor, the machine-readable storage medium comprising instructions to cause the hardware processor to perform an image data processing method, the method comprising: receiving frame image data of N frames, where N>1; detecting a region of interest in one of the N frames; tracking locations of the region of interest in at least one of the N frames; and providing a merged location of the region of interest based on the locations of the region of interest in the N frames.

Embodiments of the medium may include one or more of the following features. In some embodiments, the method includes providing T of the merged locations of the region of interest for T respective groups of N frames, where T>1; providing respective statistical data for each of the T merged locations; and providing a final location of the region of interest based on the T merged locations and the statistical data for the T merged locations. In some embodiments, the statistical data for each of the T merged locations comprises at least one of: a number of the frames in which the region of interest appeared; and a percentage of the frames in which the region of interest appeared. In some embodiments, the method includes receiving a previously-detected location for the region of interest; and providing the final location of the region of interest based on the previously-detected location, the T merged locations, and the statistical data for the T merged locations. In some embodiments, the method includes receiving trained parameters of feature descriptions; detecting at least one potential ROI in a first frame in the sequence; and detecting the region of interest based on the at least one detected potential ROI. In some embodiments, the method includes tracking the locations of the region of interest based on the at least one detected potential ROI.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

One or more of the various embodiments of the present disclosure is directed to detecting regions of interest (ROIs) for objects using multiple image frames. In particular, this invention relates to determining reliable regions of interest in image sequences using vision processing. The invention analyzes outputs from a sequence of frames, rather than from a single image, for example in a video mode, to determine whether the extracted ROI meets required purposes so as to reduce false detection with more accuracy and less transfer bandwidth.

This invention presents a novel method that considers ROI object tracking and detection in an integrated framework in order to reduce false results. With the help of object tracking, object detection becomes more stable. The inspiration of the invention follows our vision system: If one wants to identify an object in a scene, one may have some difficulty exactly determining the object from a brief glance; however, if one can stare at it for a while, the identification of the object becomes much more accurate.

According to some embodiments, one or more ROIs are determined by employing an artificial intelligence (AI) based image recognition technique referred to herein as 'accurate ROI extraction aided by object tracking.' According to this technique, it is possible to obtain frame image data that can be transmitted through a data communication link of a narrow bandwidth, while maintaining specificity of key contents of the image data. In some embodiments, an image sensor configured to carry out an AI-based image recognition may be mounted on a post near a traffic signal, a pedestrian crossing for a roadway, or the like. Image data obtained from the image sensor may be transmitted to a local system and further a cloud system for further image processing. When the image sensor is mounted as described, the key contents of the image data may include valuable information, such as the identities of people, vehicles, and the like.

Figure 1:
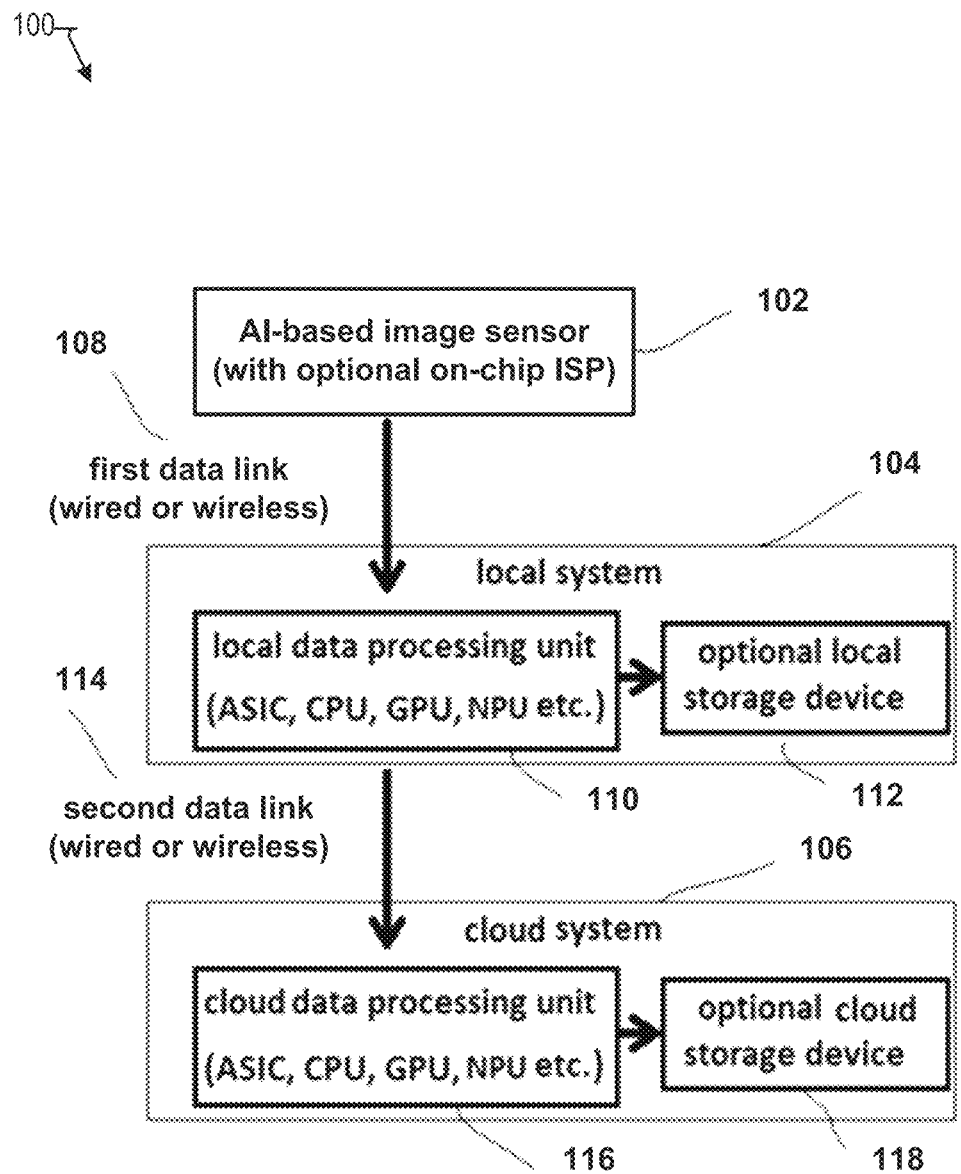
FIG. 1 illustrates an exemplary system for communicating video frame image data captured by an artificial intelligence (AI) based image sensor according to various embodiments.

FIG. 1 illustrates an exemplary system 100 for communicating video frame image data captured by an artificial intelligence (AI) based image sensor according to various embodiments. In FIG. 1, the system 100 includes an artificial intelligence (AI) based image sensor 102, a local system 104, and a cloud system 106.

The AI-based image sensor 102 is configured to obtain original video frame image data from the real world and carry out AI-based image data processing. In some embodiments, the AI-based image sensor 102 is configured to obtain original video frame image data from the image sensor array, and pre-process the obtained original video frame image data to extract key information. Through the pre-processing, the AI sensor chip 102 may reduce the bandwidth from original video frame data frame rate to a lower bandwidth data stream which can be transferred through the first data link 108. In some embodiments, in extracting key information, the AI-based image sensor 102 is configured to determine which part of the original video frame data may contain key image data and needs to be kept, and non-key image data that may be compressed to reduce the overall data bandwidth. More detail of the AI-based image data processing will be described below.

In some embodiments, the AI-based image sensor 102 is formed as a chip on which an image sensor array is disposed. In a specific implementation, the AI-based image sensor 102 also includes an image signal processor (ISP) on the chip to carry out the AI-based image data processing. In a specific implementation, the AI-based image sensor 102 may be mounted on a post to capture surrounding images thereof. The output image data from the AI-based image sensor 102 may be either raw or ISP processed format, such as YUV, or Motion-JPEG. The output image data from the AI-based image sensor 102 is transmitted through the first data link 108 to a local data processing unit 110 in the local system 104. The first data link 108 may be a wired link or a wireless link, and the wireless link may be any applicable wireless data communication link such as a WiFi, Bluetooth, ZigBee, etc.

The local system 104 represents a computing system disposed proximate to the AI-based image sensor 102 and configured to perform additional image data processing for various applicable purposes. For example, when the AI-based image sensor 102 is mounted on a post to capture images of surrounding environments, the local system 104 may be a computing system configured to perform an autonomous operation of operating roadway signals for pedestrians and vehicles based on output image data from the AI-based image sensor 102. In some embodiments, the local data processing unit 110 is implemented as a field-programmable gate array (FPGA), a graphics processing unit (GPU), a tensor processing unit (TPU), a network processing unit (NPU), and/or a central processing unit (CPU).

In some embodiments, the AI-based image sensor 102 may be manufactured using a mixed-signal silicon process, e.g., 90 nm mixed-signal process, which supports both digital MOSFET and analog MOSFET as sensor elements of the AI-based image sensor 102. To the contrary, the local data processing unit 110 may be manufactured using digital MOSFET. For that reason, a highly advanced silicon process, e.g., 14 nm process, may be employed to achieve high performance. Therefore, in some embodiments, it may be preferable to dispose the ISP in the local system 104 rather than to use an on-chip ISP within the AI-based image sensor 102.

The local system 104 may also include an optional local storage device 112 for storing image data processed by the local data processing unit 110. The bandwidth of the first data link 108 and/or the processing power of the local data processing unit 110 is typically limited. As a result, the resolution and frame rate of the AI-based image sensor 102 that can be effectively utilized may be largely limited in many applications. Output image data of the local system 104 is transmitted through a second data link 114 to the cloud system 106.

The cloud system 106 represents a computing system disposed separately from the local system 104 and the AI-based image sensor 102 and configured to perform additional image data processing for various applicable purposes. For example, when the local system 104 is mounted on a post to capture images of surrounding environments, the cloud system 106 may be a server computing system configured to perform data analysis of operations by the local system 104 and/or image data obtained from the local system 104. The data analysis may include traffic analysis, monitoring of vehicles, humans, animals, etc. The cloud system 106 includes a cloud data processing unit 116 and an optional cloud storage device 118. In some embodiments, the cloud data processing unit 116 has a more powerful processing power than the local data processing unit 110 and the optional cloud storage device 118 has a larger storage capacity than the optional local storage device 112. In a specific implementation, the bandwidth of the second data link 114 may be significantly limited in comparison to the processing power of the local data processing unit 110.

Figure 2:
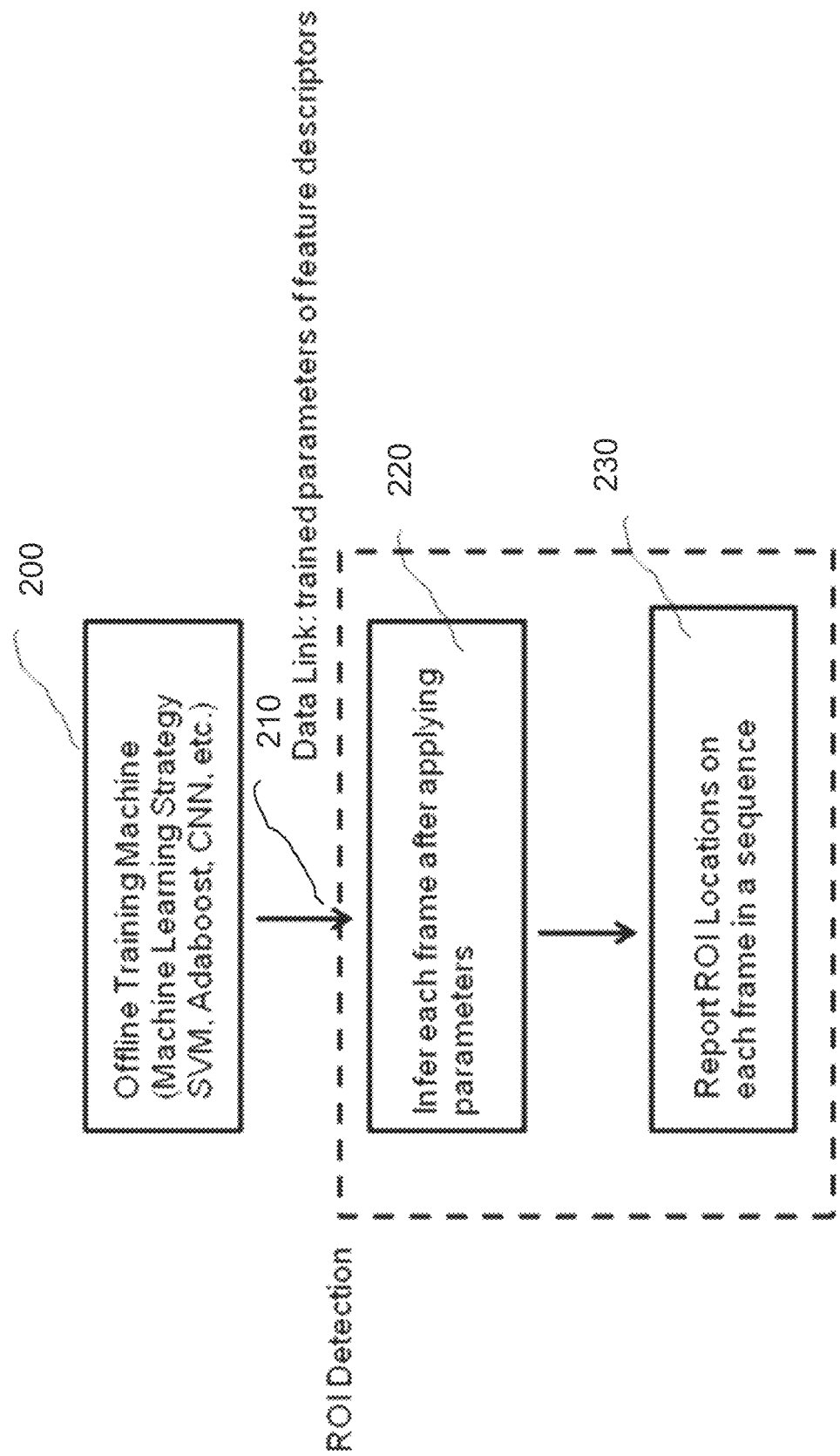
FIG. 2 shows a conventional process for ROI detection from a single image.

FIG. 2 shows a conventional process for ROI detection from a single image. A processing unit 200 acts as a training machine that determines fundamental features of an interesting object. The input to the training machine is a large bundle of positive examples and negative examples, while the outputs 210 are trained parameters of feature descriptions that can differentiate the positive examples from negative ones. The training machine may implement any machine learning strategy, including Support Vector Machine (SVM), Adaboost, Convolutional Neural Network (CNN), or others.

The output data 210 of processing unit 200 is passed though data link 110 to inference processing unit 220. A block size is defined for image processing. The inference processing unit 220 accepts a single image, applies the parameters of feature descriptions to the image on every block centered at each pixel, and predicts the ROI regions on predict unit 230.

Figure 3:
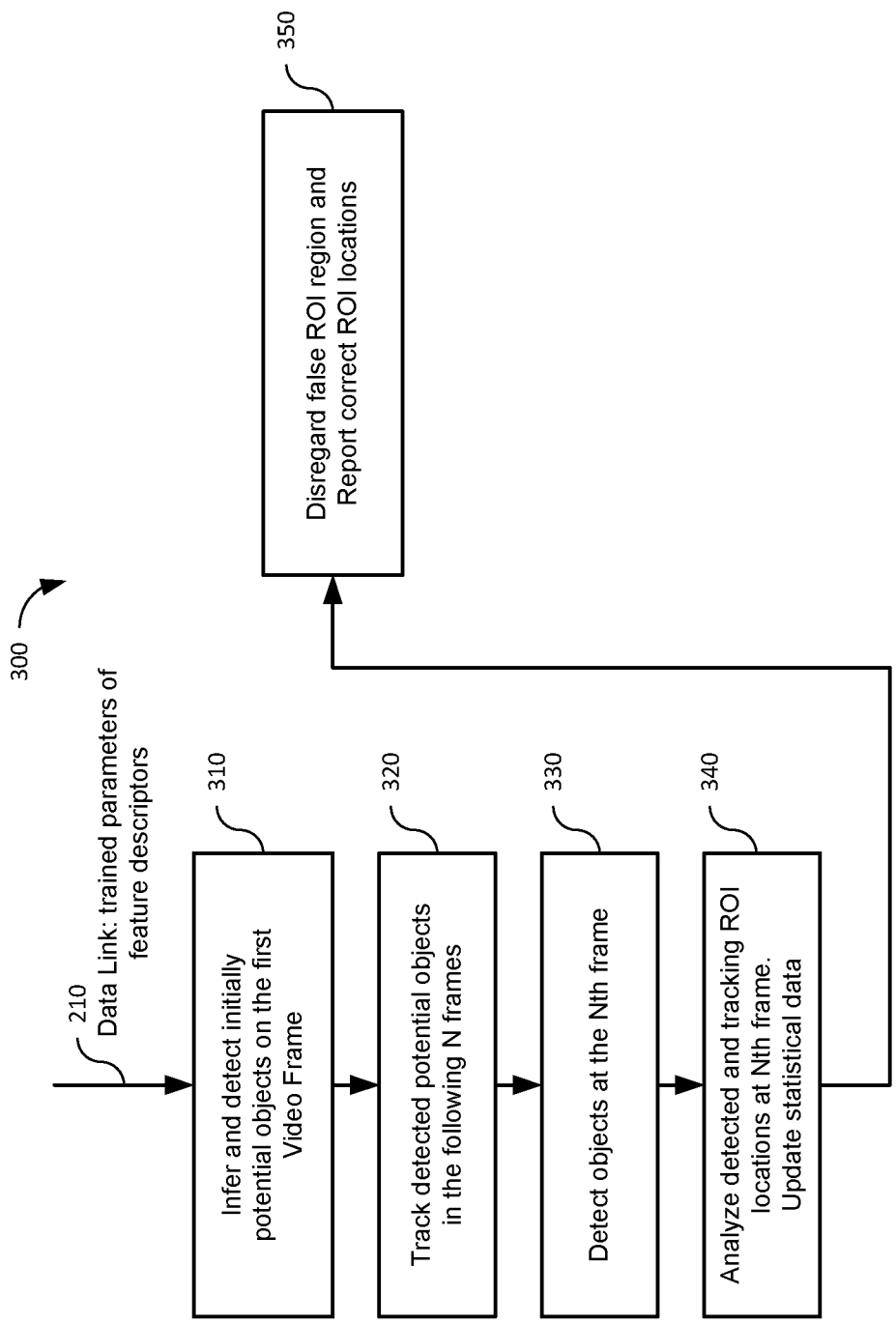
FIG. 3 illustrates an exemplary data flow in an AI-based image data processing device for ROI detection with tracking from a sequence of frames according to various embodiments.

FIG. 3 illustrates an exemplary data flow 300 in an AI-based image data processing device for ROI detection with tracking from a sequence of frames according to various embodiments. The AI-based image data processing device includes an inference unit 310, a track unit 320, a detect unit 330, an analysis unit 340, and a vote unit 350. Each of the inference unit 310, track unit 320, detect unit 330, analysis unit 340, and vote unit 350 may be configured by a specifically configured circuitry and/or a software-based computer system such as described below with reference to FIG. 9.

The inference unit 310 receives the trained parameters of feature descriptions 210. Instead of directly reporting ROI locations one each frame, the inference unit 310 initially detects potential objects on the first frame in the sequence. The inference unit 310 may implement any ROI detector, including SVM, Adaboost, CNN, and others. The track unit 320 tracks the locations of the detected potential objects. The track unit 320 may implement any tracking methods, for example including Block Correlation, Minimal Average Difference, Maximal Entropy, or others. The detect unit 330 detects object ROIs in every Nth frame. The detect unit 330 may implement any ROI detector. The analysis unit 340 analyzes the detected and tracked ROI locations every Nth frame, and maintains statistical data for the ROIs. The vote unit 350 disregards false ROI locations and reports correct ROI locations.

Figure 4:
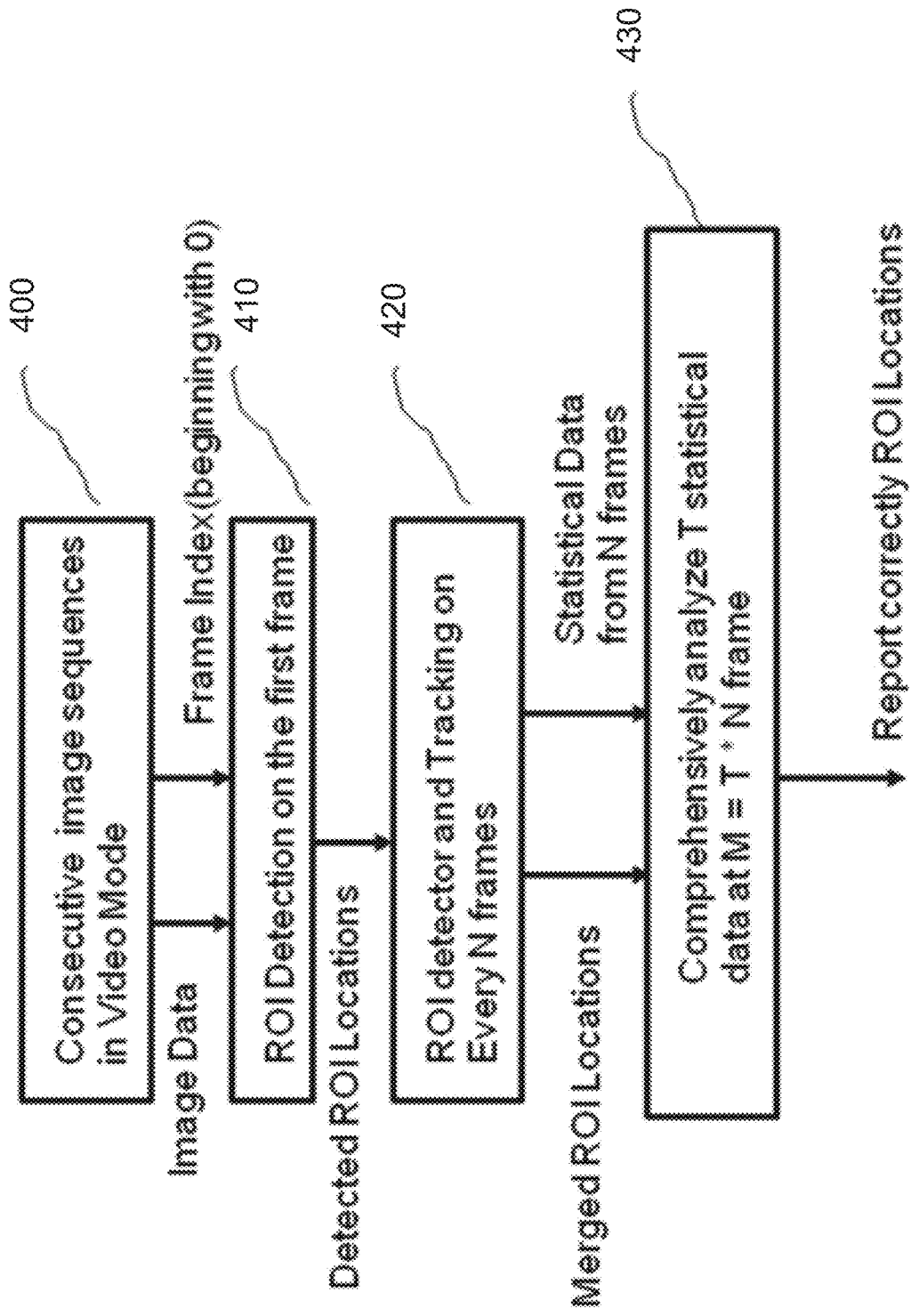
FIG. 4 illustrates an exemplary data flow in an AI-based image data processing device for ROI detection with tracking from a sequence of frames according to various embodiments.

FIG. 4 illustrates an exemplary data flow in an AI-based image data processing device for ROI detection with tracking from a sequence of frames according to various embodiments. The AI-based image data processing device includes an input unit 400, a detect unit 410, a detect and track unit 420, and an analysis unit 430. Each of input unit 400, detect unit 410, detect and track unit 420, and analysis unit 430 may be configured by a specifically configured circuitry and/or a software-based computer system such as described below with reference to FIG. 9.

The input unit 400 receives a sequence of frames of image data, for example such as consecutive image frames generated in an image sensor operating in a video mode. The input unit 400 assigns each frame a frame index, beginning with 0. The detect unit 410 processes the first frame to detect potential ROI locations. These locations are fed into detect and track unit 420 for tracking the locations in the following frames. Besides tracking, detect and track unit 420 also detects ROIs at every Nth frame in the sequence, and merges the locations of the detected ROIs with the respective tracked locations. The detect and track unit 420 also generates and updates detection statistics for each potential object. After the Nth frame, the detect and track unit 420 provides the statistics, and the merged ROI locations, to the analysis unit 430. Normally, the detect and track unit 420 repeats this process T times. When the Mth frame is reached, where M=T×N, the analysis unit 430 disregards false detections, and reports correct ROI locations, based on the statistics.

Figure 5:
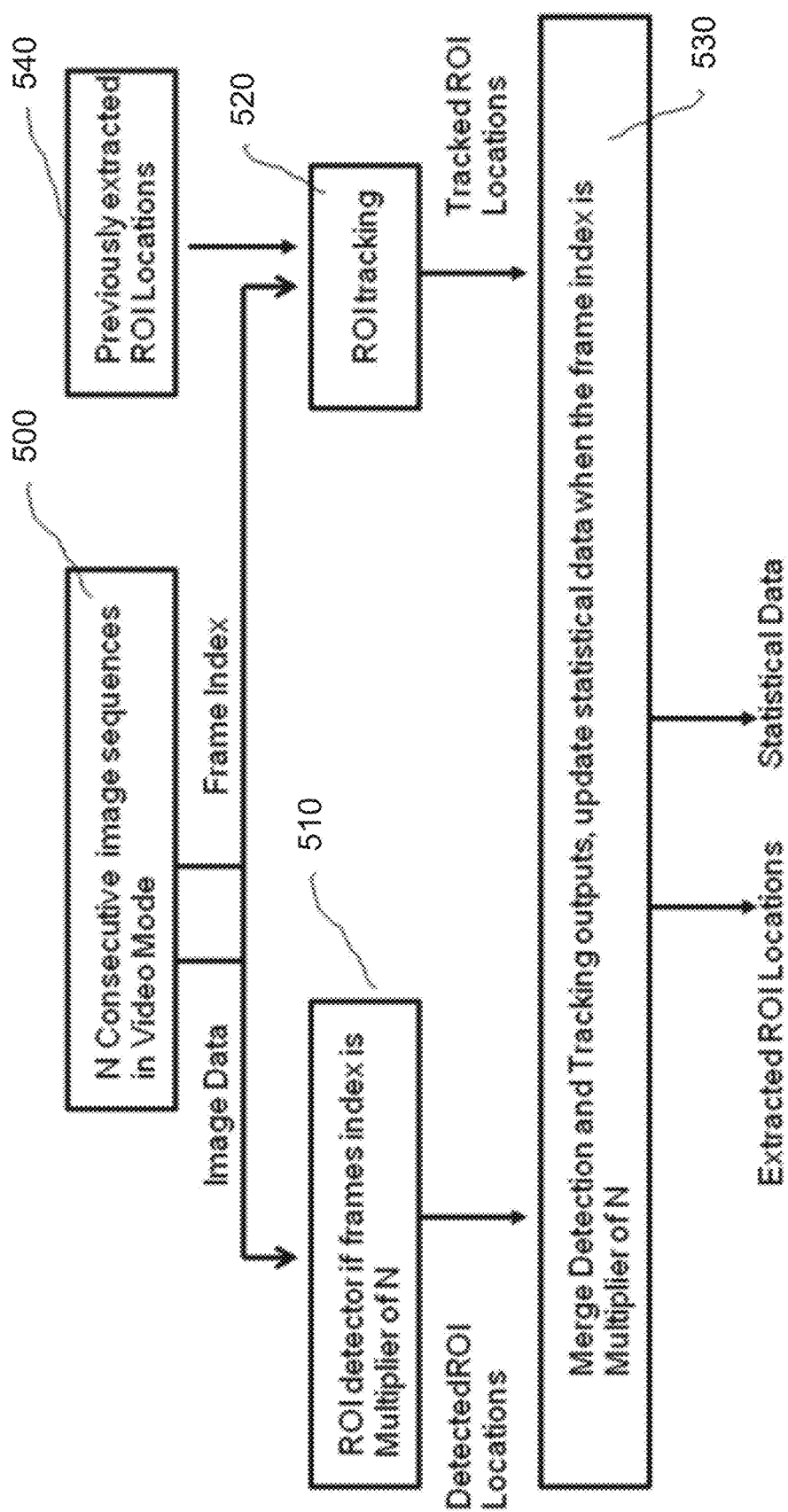
FIG. 5 illustrates an exemplary data flow in an AI-based image data processing device for ROI detection with tracking from a sequence of N frames according to various embodiments.

FIG. 5 illustrates an exemplary data flow in an AI-based image data processing device for ROI detection with tracking from a sequence of N frames according to various embodiments. The AI-based image data processing device includes an image input unit 500, a detect unit 510, a track unit 520, an analysis unit 530, and a ROI input unit 540. Each of image input unit 500, detect unit 510, track unit 520, analysis unit 530, and ROI input unit 540 may be configured by a specifically configured circuitry and/or a software-based computer system such as described below with reference to FIG. 9.

The image input unit 500 receives a sequence of N frames of image data, for example such as consecutive image frames generated in an image sensor operating in a video mode. The image input unit 500 assigns each frame a frame index, beginning with 0. The image input unit 500 provides the frames and frame indexes to both detect unit 510 and track unit 520. The ROI input unit 540 provides previous ROI locations to track unit 520. The previous ROI locations may include ROIs extracted from the first frame in the sequence, which may be provided by detect unit 310 of FIG. 3. The previous ROI locations may include ROIs extracted from the previous sequence of N frames, which may be provided by the analysis unit 340 of FIG. 3, by the detect and track unit 420 of FIG. 4, or by the analysis unit 530 of FIG. 5.

The detect unit 510 detects object ROIs in every Nth frame. The detect unit 510 may implement any ROI detector. The track unit 520 tracks the locations of the ROIs in every frame in the sequence. The track unit 520 may implement any tracking method. At the Nth frame in the sequence, the analysis unit 530 merges the detected ROI locations generated by the detect unit 510, and the tracked ROI locations generated by the track unit 520. Based on this data, the analysis unit 530 creates ROI locations for new objects, adjusts ROI locations for existing objects, and generates and updates statistical data for all objects.

Figure 6:
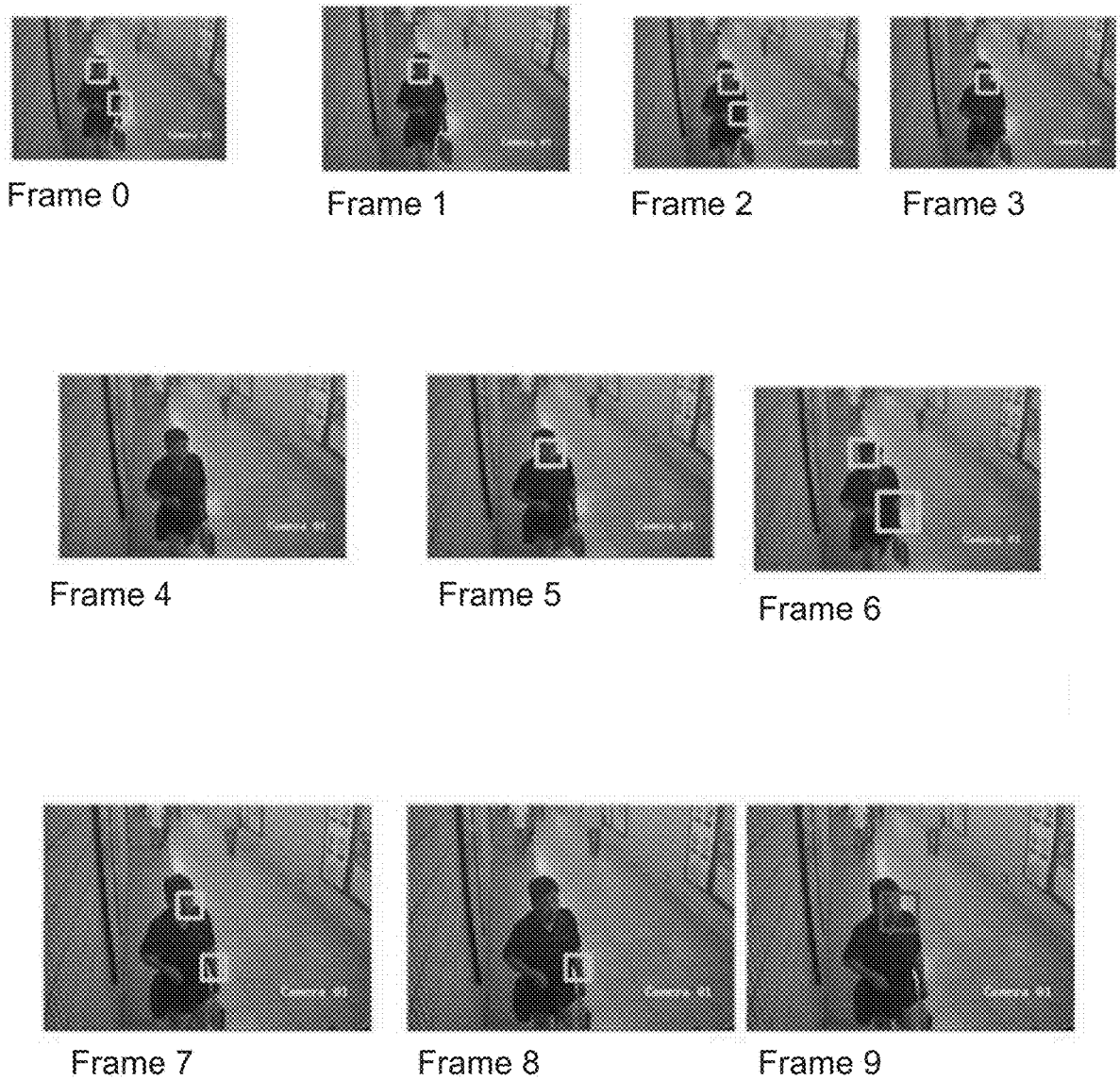
FIG. 6 presents an example of face ROI extraction without tracking for a sequence of frames.

FIG. 6 presents an example of conventional face ROI extraction without tracking for a sequence of frames. In this example, the system applies an ROI detection method on Frame 0, and outputs the results, which include not only a true face detection, but also a false detection, of an arm. In the following frames, the system does not consider the interrelation among consecutive frames, but instead works on each frame independently. Therefore, the system generates lots of false detections, including more detections of the arm, resulting in wasted transfer bandwidth.

Figure 7:
FIG. 7 presents an example of face ROI extraction with tracking according to various embodiments.

FIG. 7 presents an example of face ROI extraction with tracking according to various embodiments. In this example, the interrelation between consecutive frames is taken into account, as described elsewhere in this disclosure. Here tracked ROIs are shown in yellow boxes, and detected ROIs are shown in red boxes.

Referring to FIG. 7, the system applies an ROI extraction method on initial Frame 0, and detects two ROIs. One is a face ROI, and the other one is arm ROI. However, the system does not provide the results immediately. In the following frames, the locations of these two detected objects, face and arm, are tracked. The system then detects ROIs, not on every frame, but instead on every Nth frame, and updates statistical data about detection and tracking for each object. In this example, N is set to be 3. This procedure repeats T times, which is set to be 3 in this example.

In the first sequence of three frames (T=1), in Frames 1 and 2, the ROIs detected in Frame 0 are tracked. In Frame 3, the system performs ROI detection and tracking. In Frame 3, the face ROI is shown in the red box to indicate it has been detected. The statistics are updated to show that the face ROI has been detected once, and the arm ROI has been detected once.

In the second sequence of three frames (T=2), in Frames 4 and 5, the ROIs detected previously are tracked. In Frame 6, the system performs ROI detection and tracking. In Frame 6, both the face ROI and the arm ROI are shown in red boxes to indicate they had been detected. The statistics are updated to show that the face ROI has been detected twice, and the arm ROI has been detected once.

In the third sequence of three frames (T=3), in Frames 7 and 8, the ROIs detected previously are tracked. In Frame 9, the system performs ROI detection and tracking. If one object ROI appears enough in T extractions, its ROI is labeled TRUE; otherwise, the ROI will be labeled FALSE. In this example, in the consecutive 9 frames, the face ROI is detected 7 times, for a 78% detection rate. The arm ROI is detected only 3 times, for a 33% detection rate. A true detection threshold may be set at 5 times, or 56%. Using this threshold, the face ROI is labeled TRUE, while the arm ROI is labeled FALSE. In Frame 9, only the face ROI is shown in a red box to indicate a true detection. So only one ROI is produced, with higher accuracy and less required bandwidth.

Figure 8:
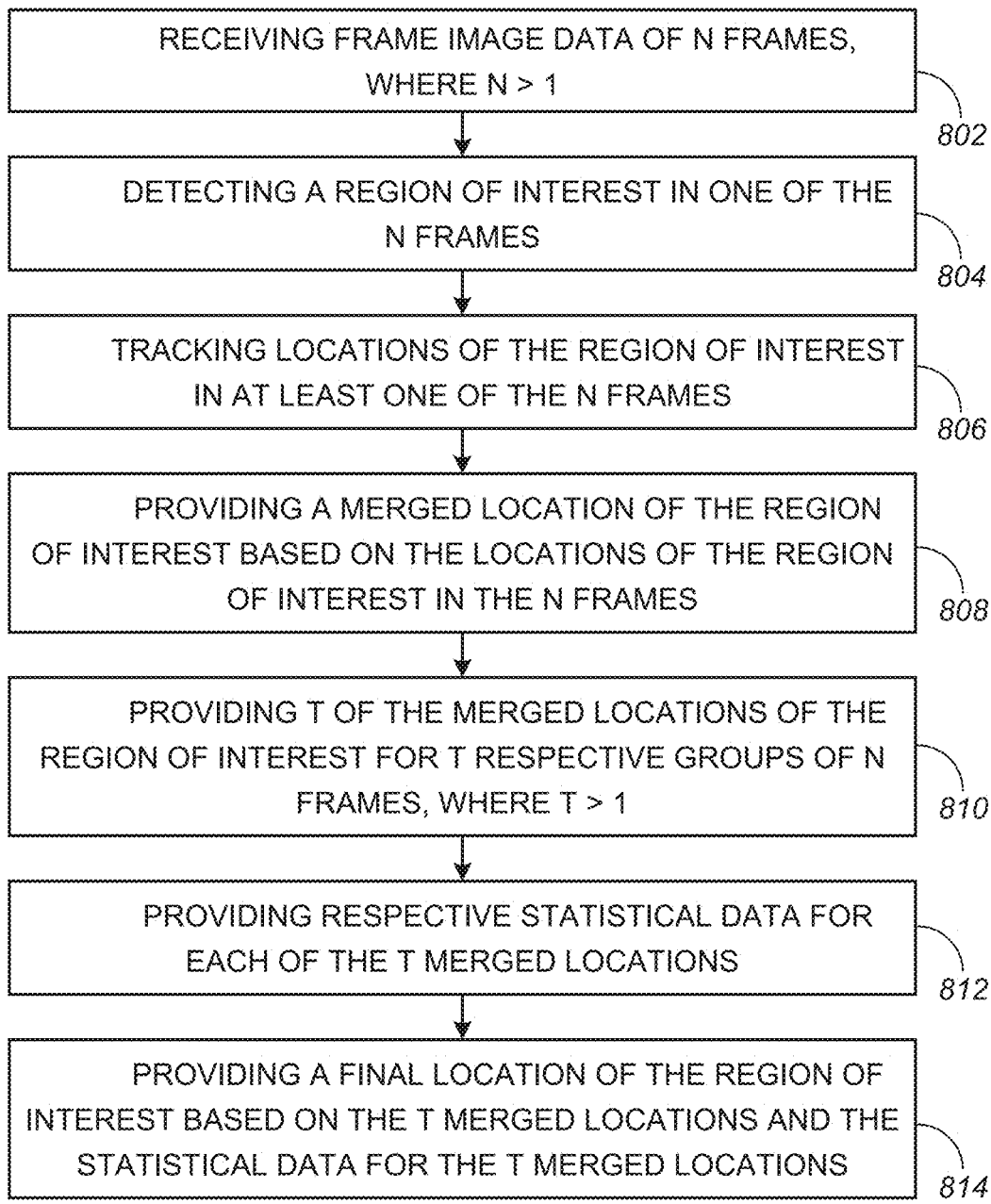
FIG. 8 illustrates a flowchart of an exemplary image data processing method according to various embodiments.

FIG. 8 illustrates a flowchart 800 of an exemplary image data processing method 800 according to various embodiments. The exemplary method may be implemented in various environments including, for example, the functional units of the AI-based image sensor illustrated in FIG. 1. The operations of the exemplary method presented below are intended to be illustrative. Depending on the implementation, the exemplary method may include additional, fewer, or alternative steps performed in various orders or in parallel. Also, this flowchart illustrates blocks (and potentially decision points) organized in a fashion that is conducive to understanding. It should be recognized, however, that the blocks can be reorganized for parallel execution, reordered, and modified (changed, removed, or augmented), where circumstances permit.

The flowchart 800 starts at block 802, with receiving frame image data of N frames, where N>1. The frame image data may be received from an image sensor. The frames may be consecutive images in a video, for example such as a video produced by an image sensor in video mode. In a specific implementation, the image input unit 500 of FIG. 5 receives the frames from an image sensor array of an AI-based image sensor.

The flowchart 800 continues to block 804, with detecting a region of interest in one of the N frames. In a specific implementation, the detect unit 510 of FIG. 5 detects the region of interest. Some embodiments comprise receiving trained parameters of feature descriptions, detecting at least one potential ROI in a first frame in the sequence, and detecting the potential ROI in every Nth frame in the following sequence.

The flowchart 800 continues to block 806, with tracking locations of the region of interest in at least one of the N frames. In a specific implementation, the track unit 520 of FIG. 5 tracks the locations in every frame.

The flowchart 800 continues to block 808, with providing a merged location of the region of interest based on the locations of the region of interest in the N frames. In a specific implementation, the analysis unit 530 of FIG. 5 provides the merged location of the region of interest. Some embodiments comprise receiving a previously-detected location for the region of interest, and providing the final location of the region of interest based on the previously-detected location, the T merged locations, and the statistical data for the T merged locations. Some embodiments comprise tracking the locations of the region of interest based on the at least one detected potential ROI.

The flowchart 800 continues to block 810, with providing T of the merged locations of the region of interest for T respective groups of N frames, where T>1. In a specific implementation, the analysis unit 530 of FIG. 5 provides the T merged locations of the region of interest for the T respective groups of N frames.

The flowchart 800 continues to block 812, with providing respective statistical data for each of the T merged locations. In a specific implementation, the analysis unit 530 of FIG. 5 provides the respective statistical data for each of the T merged locations. The statistical data for each of the T merged locations includes a number of the frames in which the region of interest appeared, a percentage of the frames in which the region of interest appeared, or both, as well as other statistical measures.

The flowchart 800 continues to block 814, with providing a final location of the region of interest based on the T merged locations and the statistical data for the T merged locations. In a specific implementation, the analysis unit 530 of FIG. 5 provides the final location of the region of interest.

Figure 9:
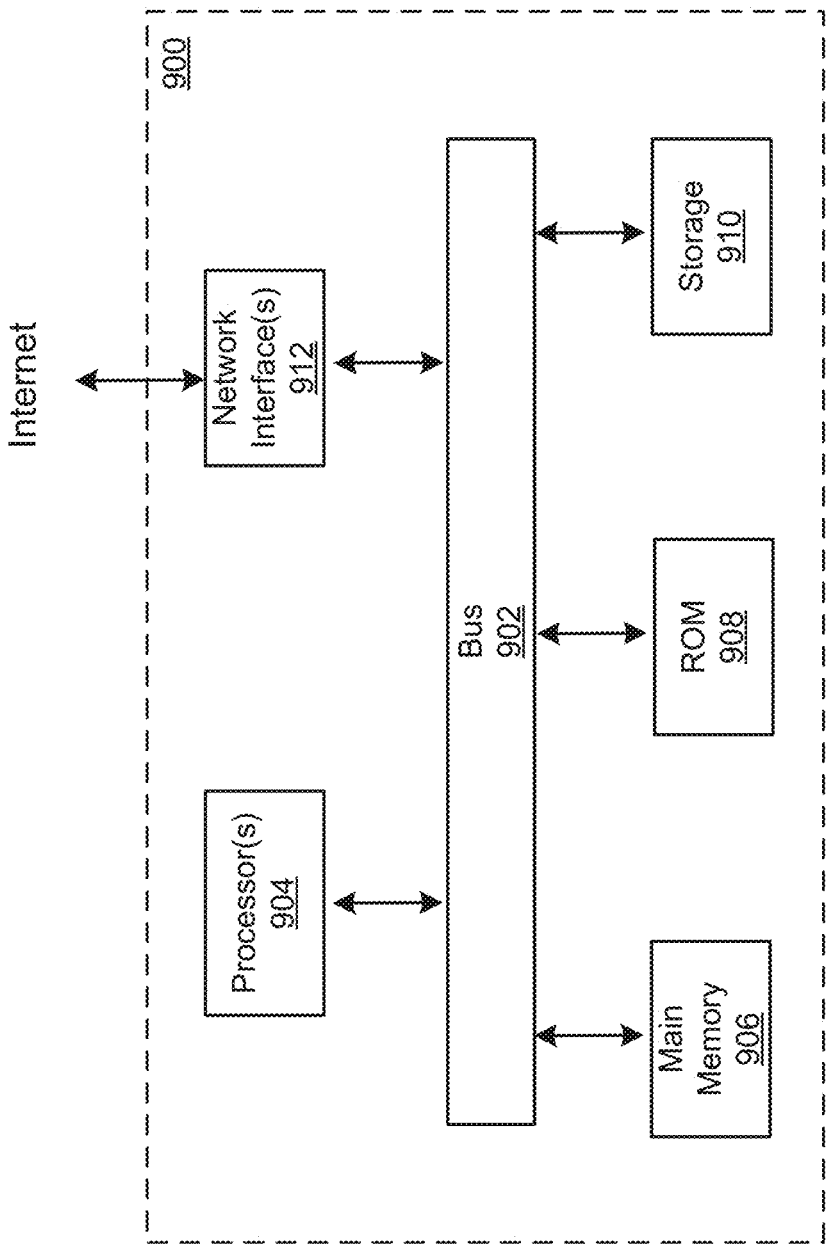
FIG. 9 illustrates a block diagram of an exemplary computer system 900 to implement one or more of functionalities of the AI-based image sensor according to various embodiments.

FIG. 9 illustrates a block diagram of an exemplary computer system 900 to implement one or more of functionalities of the AI-based image sensor according to various embodiments. In some embodiments, the system 900 may correspond to one or more of the first resolution modification unit 204, the feature detection unit 206, the second resolution modification unit 212, the pre-processing unit 214, and the data combination unit 216 illustrated in FIG. 2. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The main memory 906, the ROM 908, and/or the storage 910 may include non-transitory storage media. The term 'non-transitory media,' and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term 'invention' merely for convenience and without intending to voluntarily limit the scope of this application to any single disclosure or concept if more than one is, in fact, disclosed.

The Detailed Description is not to be taken in a limiting sense, and the scope of various embodiments is defined only by the appended claims, along with the full range of equivalents to which such claims are entitled.

The invention claimed is:

1. A computer-implemented image data processing method comprising:
   receiving frame image data of N frames from an image sensor, where N>1;
   detecting a region of interest in one of the N frames;
   tracking locations of the region of interest in a plurality of the N frames;
   providing T merged locations of the region of interest for T respective groups of N frames, wherein each of the T merged locations is based on the locations of the region of interest in the respective group of the N frames by merging the locations of the region of interest, wherein T>1;
   providing respective statistical data for each of the T merged locations; and
   providing a final location of the region of interest based on the T merged locations and the statistical data for the T merged locations;
   wherein the statistical data for each of the T merged locations comprises at least one of:
   a number of the N frames in the respective group of the N frames in which the region of interest appeared; and
   a percentage of the N frames in the respective group of the N frames in which the region of interest appeared.

2. The computer-implemented image data processing method of claim 1, further comprising:
   receiving a previously-detected location for the region of interest; and
   providing the final location of the region of interest based on the previously-detected location, the T merged locations, and the statistical data for the T merged locations.

3. The computer-implemented image data processing method of claim 1, further comprising:
   receiving trained parameters of feature descriptions;
   detecting at least one potential region of interest (ROI) in a first frame in one of the groups of the N frames based on the trained parameters of feature descriptions; and
   detecting the at least one detected potential ROI in every Nth frame in the one of the groups of the N frames.

4. The computer-implemented image data processing method of claim 3, further comprising:
   tracking the locations of the region of interest based on the at least one detected potential ROI.

5. An apparatus comprising:
   an image sensor;
   an image input circuit configured to receive, from the image sensor, receiving frame image data of N frames, wherein N>1;
   a detect circuit configured to detect a region of interest in one of the N frames;
   a track circuit configured to track locations of the region of interest in a plurality of the N frames; and
   an analysis circuit configured to:
     provide T merged locations of the region of interest for T respective groups of N frames, wherein each of the T merged locations is based on the locations of the region of interest in the respective group of the N frames by merging the locations of the region of interest, wherein T>1,
     provide respective statistical data for each of the T merged locations, and
     provide a final location of the region of interest based on the T merged locations and the statistical data for the T merged locations;
   wherein the statistical data for each of the T merged locations comprises at least one of:
     a number of the N frames in the respective group of the N frames in which the region of interest appeared, and
     a percentage of the N frames in the respective group of the N frames in which the region of interest appeared.

6. The apparatus of claim 5, further comprising:
   an ROI input circuit configured to receive a previously-detected location for the region of interest;
   wherein the analysis circuit is further configured to provide the final location of the region of interest based on the previously-detected location, the T merged locations, and the statistical data for the T merged locations.

7. The apparatus of claim 5, further comprising:
   receiving trained parameters of feature descriptions;
   wherein the detect circuit is further configured to detect at least one potential region of interest (ROI) in a first frame in one of the groups of the N frames based on the trained parameters of feature descriptions; and
   wherein the detect circuit is further configured to detect the at least one detected potential ROI in every Nth frame in the one of the groups of the N frames.

8. The apparatus of claim 5, wherein the track circuit is further configured to:
   track the locations of the region of interest based on the at least one detected potential ROI.

9. A non-transitory machine-readable storage medium encoded with instructions executable by a hardware processor, the machine-readable storage medium comprising instructions to cause the hardware processor to perform an image data processing method, the method comprising:
   receiving, from an image sensor, frame image data of N frames, where N>1;
   detecting a region of interest in one of the N frames;
   tracking locations of the region of interest in a plurality of the N frames;
   providing T merged locations of the region of interest for T respective groups of N frames, wherein each of the T merged locations is based on the locations of the region of interest in the respective group of the N frames by merging the locations of the region of interest, wherein T>1;
   providing respective statistical data for each of the T merged locations; and providing a final location of the region of interest based on the T merged locations and the statistical data for the T merged locations;
wherein the statistical data for each of the T merged locations comprises at least one of:
a number of the N frames in the respective group of the N frames in which the region of interest appeared, and
a percentage of the N frames in the respective group of the N frames in which the region of interest appeared.

10. The medium of claim 9, the method further comprising:
receiving a previously-detected location for the region of interest; and
providing the final location of the region of interest based on the previously-detected location, the T merged locations, and the statistical data for the T merged locations.

11. The medium of claim 9, the method further comprising:
receiving trained parameters of feature descriptions;
detecting at least one potential region of interest (ROI) in a first frame in one of the groups of the N frames based on the trained parameters of feature descriptions; and
detecting the at least one potential ROI in every Nth frame in the one of the groups of the N frames.

12. The medium of claim 11, the method further comprising:
tracking the locations of the region of interest based on the at least one detected potential ROI.

* * * * *